2,917,553
Patented Dec. 15, 1959

2,917,553

PROCESS FOR PREPARING 1,1-DICHLORO-2,2-DIARYLETHANES

Charles H. McKeever, Meadowbrook, and Joseph W. Nemec, Philadelphia, Pa., assignors to Rohm & Haas Company, Philadelphia, Pa., a corporation of Delaware No Drawing. Application June 26, 1958
Serial No. 744,641

4 Claims. (Cl. 260—649)

This invention relates to a process for the preparation of compounds of the general formula:

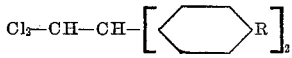

in which R is selected from the group consisting of hydrogen, halogen, methoxy and lower alkyl, said alkyl group containing from 1 to 4 carbon atoms, which comprises reacting in the presence of a strongly acidic condensing agent a compound of the formula:

$$Cl_2\!-\!C\!=\!CH\!-\!O\!-\!C_2H_5$$

with a compound of the formula

R being selected from the group consisting of hydrogen, halogen, methoxy and lower alkyl, said alkyl group containing from 1 to 4 carbon atoms.

An object of the present invention is to make available a new process for preparing known compounds with pesticidal properties.

Another object of the present invention is to make available known compounds containing pesticidal activity which are substantially free from objectionable by-products.

Processes are disclosed in the prior art for the preparation of compounds of this class, typical being the process disclosed in U.S. Patent 2,464,600. The process of this patent comprises halogenating ethanol with chlorine or bromine under the conditions as set forth therein until the reaction mixture separates into two layers and, in the case of the chlorination reaction, the lower layer attaining a specific gravity of 1.2 but containing not more than 60% of chlorine. The preferred embodiment separates the reaction mixture and employs the lower layer for condensing with an aromatic compound.

One disadvantage of the process as set forth in U.S. Patent 2,464,600 is that by-products are produced, which by-products contaminate the desired end product, lower its melting point making it difficult to grind, and since they are not pesticidal, detract from the value of the end product as a pesticide.

There are also disclosed in the prior art processes for the preparation of similar compounds which comprise condensing dihaloacetaldehyde or dihaloacetaldehyde diethyl acetal with aromatic compounds. While this condensation can be effected with a fair yield, the preparation of the dihaloacetaldehyde or its diethyl acetal is fraught with difficulties which limit the yield of these intermediates and cause a poor yield of the overall process, starting from initial materials such as ethyl alcohol and chlorine. The product obtained by the chlorination of ethyl alcohol may be converted to dichloroacetaldehyde by distillation from concentrated sulfuric acid with evolution of hydrogen chloride, formation of a charry mass and sulfur dioxide, and a yield of only about 20% to 30% of theory. Decomposition of the chlorinated product without sulfuric acid has been reported to require temperatures of 230° to 240° C.

It has now been found that many of the disadvantages of the prior art processes can be overcome and substantially pure products produced by the process of the present invention. 2,2-dichlorovinyl ethyl ether, prepared from ethanol and chlorine as hereinafter described, is reacted with benzene or a substituted benzene in the presence of an excess of a strongly acidic condensing agent.

The process for the halogenation of ethanol is set forth in detail in U.S. Patent 2,464,600 and is outlined hereinbefore. 2,2-dichlorovinyl ethyl ether can be prepared by pyrolyzing the lower layer which separates during the halogenation of ethanol with chlorine.

The 2,2-dichlorovinyl ethyl ether is condensed with an aromatic compound of the benzene series having nuclear positions available for substitution. This compound may be benzene itself, monochlorobenzene, monobromobenzene, anisole, toluene, xylene, ethylbenzene, propylbenzene, butylbenzene, methoxybenzene, ethoxybenzene, or propoxybenzene.

As a condensing agent for the desired reaction between the halogenated product and the aromatic compound, there may be used any strongly acidic condensing agent, such as sulfuric acid, oleum, tetraphosphoric acid, toluene, or benzene sulfonic acids, aluminum chloride, zinc chloride (particularly with some free hydrogen chloride), boron trifluoride and its coordination complexes, and the like. The amount of such condensing agent is at least equal molecularly to the aromatic compound reacted with the 2,2-dichlorovinyl ethyl ether and is preferably in excess. While there appear to be some slight differences among the various strongly acidic condensing agents in regard to the relative proportions of the various isomers which may be obtained from different starting materials, any of the various strongly acidic agents with obvious adjustment in conditions will effect the indicated condensation reaction between the 2,2-dichlorovinyl ethyl ether and an aromatic compound.

If desired, the aromatic compound may be used in excess and thus also serve as a solvent. While an organic solvent is not essential, it is often convenient to use one during the mixing of the reactants or during the working up of the reaction products. For such purposes, there may be used hydrocarbons, including naphthas, or other organic solvents, such as ethylene chloride, and similar solvents.

Such solvents assist in the separation and purification of the condensation products. With these products in solution, they may be readily washed with water, neutralized, and separated from the condensing agent. The solvent may then be stripped off, unreacted starting materials removed as by distillation, and the condensation products obtained as a residue which may, if desired, be purified by extraction, recrystallization, or by treatment with activated carbon.

The products obtained are valuable as toxicants in insecticidal compositions.

It is desirable to control the temperature of the reaction mixture and, depending on the reactants employed, best results are obtained when the temperature during the reaction period is maintained at about 5° C. to about 45° C. A preferred embodiment maintains the reaction mixture at a temperature of from 10° C. to 25° C.

2,2-dichlorovinyl ethyl ether was prepared by the following process. Ethanol was chlorinated by passing gaseous chlorine into anhydrous ethanol. The rate of addition was controlled so that the temperature of the reaction mixture never exceeded 35° C. As chlorine was absorbed, two layers formed. When the specific gravity of the lower layer reached 1.29 at 20° C., the addition of chlorine was terminated and the lower layer was separated from the upper, washed three times with water and dried over calcium chloride. A portion of this material (700 grams) was charged to a unit consisting of a still pot, a 10 plate glass Oldershaw distilling column and a distillation head. The head was equipped with a controller which shut off the take-off if the head temperature increased above 145° C. Also, it was set at a reflux ratio of 5/1 when distillate was being removed. There was obtained 220 grams of product which distilled at 137° to 145°; $n_D^{20}$ 1.4520. Based on an analysis for total chlorine, the material had a purity of about 93% calculated as 2,2-dichlorovinyl ethyl ether.

A second run again using a charge of 710 grams of the dried lower layer but run over a longer period of time (about 8 hours) to permit more complete cracking to the vinyl ether gave 365 grams of product; $n_D^{20}$ 1.4545. Based on chlorine analysis, the product had a purity of 96%.

The following examples set forth certain well-defined instances of the application of this invention. They are not, however, to be considered as limitations thereof, since many modifications may be made without departing from the spirit and scope of this invention.

Unless otherwise specified, all parts are parts by weight.

EXAMPLE I

*Preparation of 1,1-dichloro-2,2-bis(ethylphenyl)ethane*

141 grams (1.0 mole) 2,2-dichlorovinyl ethyl ether
212.4 grams (2.0 moles) ethylbenzene
643 grams (6.5 moles) of 99.3% $H_2SO_4$ To a well-agitated mixture of ethylbenzene and the vinyl ether was added the sulfuric acid at a temperature of 10° to 12° C. over a period of 2.25 hours. The resulting reaction mixture was agitated for three hours at 10° to 15° C. and then allowed to settle for one-half hour. The lower acid layer was removed and the residue was washed, at 50° to 60° C., with 4–500 cc. water washes; the third wash contained 50 cc. of 15% $Na_2CO_3$ solution. The washed material was stripped at 10 mm. to a final batch temperature of 100° C. to remove entrained water and unreacted ethylbenzene. There was obtained 205 grams of technical grade product, setting point 42.0° C. Yield based on vinyl ether was 67%. Recrystallization of a sample of the technical product from ethanol gave pure 1,1-dichloro-2,2-bis(ethylphenyl)-ethane, melting point 57° C.

EXAMPLE II

In experiments conducted in the same manner as in Example I, benzene and butylbenzene were employed in place of the ethylbenzene. The corresponding diphenyl and bis(butylphenyl) compounds were obtained. Recrystallization from ethanol of the technical material from the benzene reaction gave pure 1,1-dichloro-2,2-di-(phenyl)ethane, melting point 74° to 75°. Distillation of the technical butylphenyl compound gave a purified product which distilled at 193° to 194° at 0.2 mm.; $n_D^{25}$ 1.5496.

EXAMPLE III

*Preparation of 1,1-dichloro-2,2-bis(chlorophenyl)ethane*

157 grams (1.0 mole, 90% purity) 2,2-dichlorovinyl ethyl ether
225 grams (2.0 moles) chlorobenzene
545 grams (6.0 moles) 104% $H_2SO_4$ (20% oleum)

To a well-agitated solution of the vinyl ether and chlorobenzene was added the sulfuric acid at 15° to 17° C. over a period of 1.5 hours. The reaction mixture was agitated for three hours at 15° to 17° C. and then allowed to settle for one-half hour. The lower acid layer was removed and the organic layer was washed at 90° to 95° C. with four 500 cc. portions of water. The washed material was dried for one hour at 100° to 105° C. and 5 mm. There was obtained 195 grams of technical grade 1,1-dichloro-2,2-bis(chlorophenyl)ethane, setting point 87.4° C. Properties of this material are essentially equal to those of the commercially produced material.

EXAMPLE IV

In an experiment conducted as set forth in Example III, bromobenzene was substituted for chlorobenzene. 1,1-dicholoro-2,2-bis(bromophenyl)ethane was recovered in good yield.

EXAMPLE V

In an experiment conducted essentially as set forth in Example I, anisole was substituted for ethylbenzene. 1,1-dichloro-2,2-bis(methoxyphenyl)ethane having a setting point of 95.3° C. was obtained in 83% yield.

We claim:

1. A process for the preparation of compounds of the general formula:

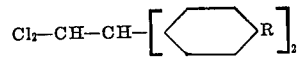

in which R is selected from the group consisting of hydrogen, halogen, methoxy and lower alkyl, said alkyl group containing from 1 to 4 carbon atoms, which comprises reacting at a temperature of from about 5° C. to about 45° C. in the presence of a strongly acidic condensing agent a compound of the formula:

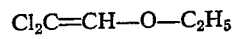

with a compound of the formula:

R being selected from the group consisting of hydrogen, halogen, methoxy and lower alkyl, said alkyl group containing from 1 to 4 carbon atoms.

2. A process for the preparation of compounds of the general formula:

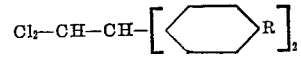

in which R is selected from the group consisting of hydrogen, halogen, methoxy and lower alkyl, said alkyl group containing from 1 to 4 carbon atoms, which comprises reacting at a temperature of from about 5° C. to about 45° C. in the presence of concentrated sulfuric acid a compound of the formula:

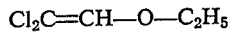

with a compound of the formula:

R being selected from the group consisting of hydrogen, halogen, methoxy and lower alkyl, said alkyl group containing from 1 to 4 carbon atoms.

3. A process for the preparation of 1,1-dichloro-2,2-bis(chlorophenyl)ethane which comprises reacting at a temperature of from about 5° C. to about 45° C. 2,2-dichlorovinyl ethyl ether with monochlorobenzene in the presence of concentrated sulfuric acid.

4. A process for the preparation of 1,1-dichloro-2,2-bis(ethylphenyl)ethane which comprises reacting at a temperature of from about 5° C. to about 45° C. 2,2-dichlorovinyl ethyl ether with ethylbenzene in the presence of concentrated sulfuric acid.

References Cited in the file of this patent

UNITED STATES PATENTS 2,464,600     Meitzner et al. _____ Mar. 15, 1949

OTHER REFERENCES

Chattaway et al.: "Jour. Chem. Soc.," vol. 125, pp. 1097–1101 (1924).